United States Patent [19]

Farmont

[11] Patent Number: 5,500,515

[45] Date of Patent: Mar. 19, 1996

[54] METHOD OF USING A PARKING CARD FOR OPERATING A PARKING BARRIER FOR PAY PARKING

[76] Inventor: Johann Farmont, Talstrasse 1,, 4000 Dusseldorf 1, Germany

[21] Appl. No.: 357,546

[22] Filed: Dec. 14, 1994

Related U.S. Application Data

[63] Continuation of Ser. No. 84,545, Jun. 29, 1993, abandoned.

[51] Int. Cl.$^6$ .................................................. G07B 15/02
[52] U.S. Cl. ........................... 235/384; 40/27.5; 194/214; 194/902
[58] Field of Search .................... 235/384, 492, 235/382, 435; 194/902, 214

[56] References Cited

U.S. PATENT DOCUMENTS

| | | |
|---|---|---|
| 2,063,356 | 12/1936 | Wiggins . |
| 3,397,764 | 8/1968 | Simjian . |
| 3,766,452 | 10/1973 | Burpee et al. . |
| 4,101,701 | 7/1978 | Gordon . |
| 4,257,436 | 3/1981 | Smith . |
| 4,319,674 | 3/1982 | Riggs et al. . |
| 4,380,699 | 4/1983 | Monnier et al. . |
| 4,395,043 | 7/1983 | Gargione . |
| 4,585,930 | 4/1986 | Casden . |
| 4,674,618 | 6/1987 | Eglise et al. ............................ 235/487 |
| 4,703,164 | 10/1987 | von Ballmoos ........................ 235/384 |
| 4,717,815 | 1/1988 | Tomer . |
| 4,788,102 | 11/1988 | Koning et al. . |
| 4,865,222 | 9/1989 | Sullivan . |
| 4,868,373 | 9/1989 | Opheij . |
| 4,926,996 | 5/1990 | Eglise . |
| 4,960,983 | 10/1990 | Inoue ..................................... 235/492 |
| 4,969,549 | 11/1990 | Eglise . |
| 4,982,070 | 1/1991 | Bezin et al. ............................ 235/492 |
| 4,990,759 | 2/1991 | Gloton et al. .......................... 235/492 |
| 5,206,495 | 4/1993 | Kreft ....................................... 235/492 |
| 5,208,110 | 5/1993 | Smith et al. . |

FOREIGN PATENT DOCUMENTS

| | | |
|---|---|---|
| 391375 | 9/1990 | Austria . |
| 0402821 | 12/1990 | European Pat. Off. . |
| 2625351 | 12/1987 | France . |
| 2231720 | 1/1973 | Germany . |
| 2557984 | 6/1977 | Germany . |
| 2628595 | 1/1978 | Germany . |
| 2926867 | 1/1981 | Germany . |
| 3307986 | 9/1983 | Germany . |
| 3339387 | 5/1984 | Germany . |
| 3608165 | 9/1986 | Germany . |
| 4021770 | 1/1992 | Germany . |
| 60-215288 | 10/1985 | Japan . |
| 4004495 | 8/1992 | Japan . |
| 5189626 | 7/1993 | Japan ..................................... 235/487 |
| 654942 | 3/1982 | Switzerland . |
| 124 | 1/1854 | United Kingdom . |
| 89/12286 | 12/1989 | WIPO . |
| 91/14237 | 9/1991 | WIPO . |

*Primary Examiner*—F. L. Evans
*Attorney, Agent, or Firm*—Steven F. Caserza; Flehr, Hohbach, Test, Albritton & Herbert

[57] ABSTRACT

The invention concerns a parking card to operate a barrier for pay parking. The card is in the form of a round, flat piece with a front and back, and a machine-readable data medium for storing and identifying information on the parking facility and the user.

10 Claims, 1 Drawing Sheet

METHOD OF USING A PARKING CARD FOR OPERATING A PARKING BARRIER FOR PAY PARKING

CROSS REFERENCE TO RELATED APPLICATIONS

This application is a continuation of U.S. application Ser. No. 08/084,545, filed Jun. 29, 1993, now abandoned.

BACKGROUND OF THE INVENTION

1. Field of the Invention

This invention relates generally to a parking control apparatus, and more specifically to an improved parking card to operate a barrier for pay parking.

2. Description of the Prior Art

Known parking cards are issued to the user on passing the control stations at the entrance of parking garages or parking lots. The data necessary for calculating the parking fee is stored on the parking card. For the use of automatic cashiers and computer control of the parking operation, it was necessary to store the various items of parking information or codes in machine-readable form. On the one hand, so-called magnetic card tickets, made of paper, which have a magnetic strip for deposit of individual parking data, are used, and, on the other hand, plastic tickets with a built-in programmable chip are used. Also known are parking cards of plastic with individualizing code, e.g., a bar code, input and output of which are controlled by the parking system's computer.

Whereas magnetic card tickets made of paper can only be used once, plastic parking cards with a programmable chip or identifying code can be used for successive parking operation either as a single parking card by different users or as a debit card by one user or as an access card for long-term parkers. This repeated input and output of plastic parking cards requires entrance and exit control stations which can store the cards to be issued or retained, convey them to a reading and control station, and transport them into a slot which is accessible to the user of the car park. For a smooth parking operation the parking card must therefore be moved in several directions in the entrance and exit control stations. For this purpose conveyor belts or rollers are provided. As the parking cards are always rectangular, however, there is a danger of their becoming unaligned with resultant susceptibility to breakdown and interruptions to the issue of parking cards and retaining for new issue.

The aim of the invention is therefore to create a parking card which is simple in design and handling.

SUMMARY OF THE INVENTION

The invention concerns a parking card to operate a barrier for pay parking. The card is in the form of a round, flat piece of plastic or other material with a front and back, and a machine-readable data medium for storing and identifying information on the parking facility and the user, and possibly also the time of entering and leaving.

A parking card is created here which can be reused and is nevertheless robust and cheaply manufactured and can be moved, as a result of its rolling capability, without elaborate transport facilities. The contactless storable and/or readable component allows use without wear through repeat scanning.

The machine readable data carrier can be in the form of a programmable chip so that the parking card can repeatedly store new user parking data and can thus be issued again and again. In this way, the parking card can be used for several successive parking operations while the operating costs are kept to a minimum.

The round parking card has a transmitting and receiving coil and data carrier chip. The contactless reading operation can be carried out up to a distance of 60 cm at a frequency of 100–250 khz. The reading operation is independent of the position of the round parking card. When a memory chip is used in the card the data is read in the same way and written to the parking card again (coded).

The parking card can be between 2.3 and 7 mm thick, and preferably between 3 and 6 mm. A card of this thickness has the stability required for rolling. The diameter of the parking card can be between 2 and 7 cm, and preferably between 4.5 and 6 cm. These diameters make the card particularly practical for the user of a multi-story or outdoor park.

The front or back of the parking card can also have an areas reserved for information on the car park and an individual identifying code.

The further features of the invention are found in the following description based on the embodiments shown in the enclosed illustrations.

DETAILED DESCRIPTION OF A PREFERRED EMBODIMENT

Figure 1:
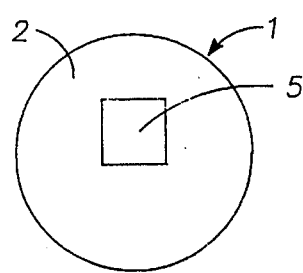
FIG. 1 is a diagrammatic top view of a first embodiment of the parking card.
Figure 2:
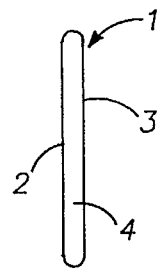
FIG. 2 is a diagrammatic side view of the parking card of FIG. 1.

FIGS. 1 and 2 show a first embodiment of a parking card for operating a parking barrier for pay parking in the form of a flat piece of plastic 1 with a front side 2 and reverse side 3, which are spaced apart and parallel to each other. Front 2 and back 3 border a roundly formed piece of plastic 1. The parking card thus has the shape of a round coin which can roll on an edge 4 forming the periphery. The space between front 2 and back 3 is completely filled with plastic material so that plastic piece 1 is solid. The space between front 2 and back 3 may also be just partly filled, however, so that the plastic piece has a hollow interior structure in order, if required, to influence the rolling behavior dependent on the weight of the parking card.

The thickness of plastic component 1 is 1 to 3 mm but can be between 0.3 and 7 mm, and preferably between 3 and 6 mm. The diameter of plastic component 1 is 60 mm, but can be between 20 and 70 mm, and preferably between 50 and 60 mm.

A machine-readable data carrier in the form of a contactless addressable chip 5 is inlet into the front 2 for storage and/or reading of different parking data. If necessary chip 5 can also have a processing as well as a storage capability and be loaded with individual menus in order to permit additional processing of the parking data. The chip can thus be reprogrammed for every parking operation so that the parking card can be issued on more than one occasion. Chip 5 also allows the parking card to be in the form of a debit or long-term parking card.

In all the embodiments of the parking card described above, plastic piece 1 can be sheathed in transparent foil. Moreover, the machine readable data medium can be arranged in or on the parking card in the center or at the side.

Figure 3:
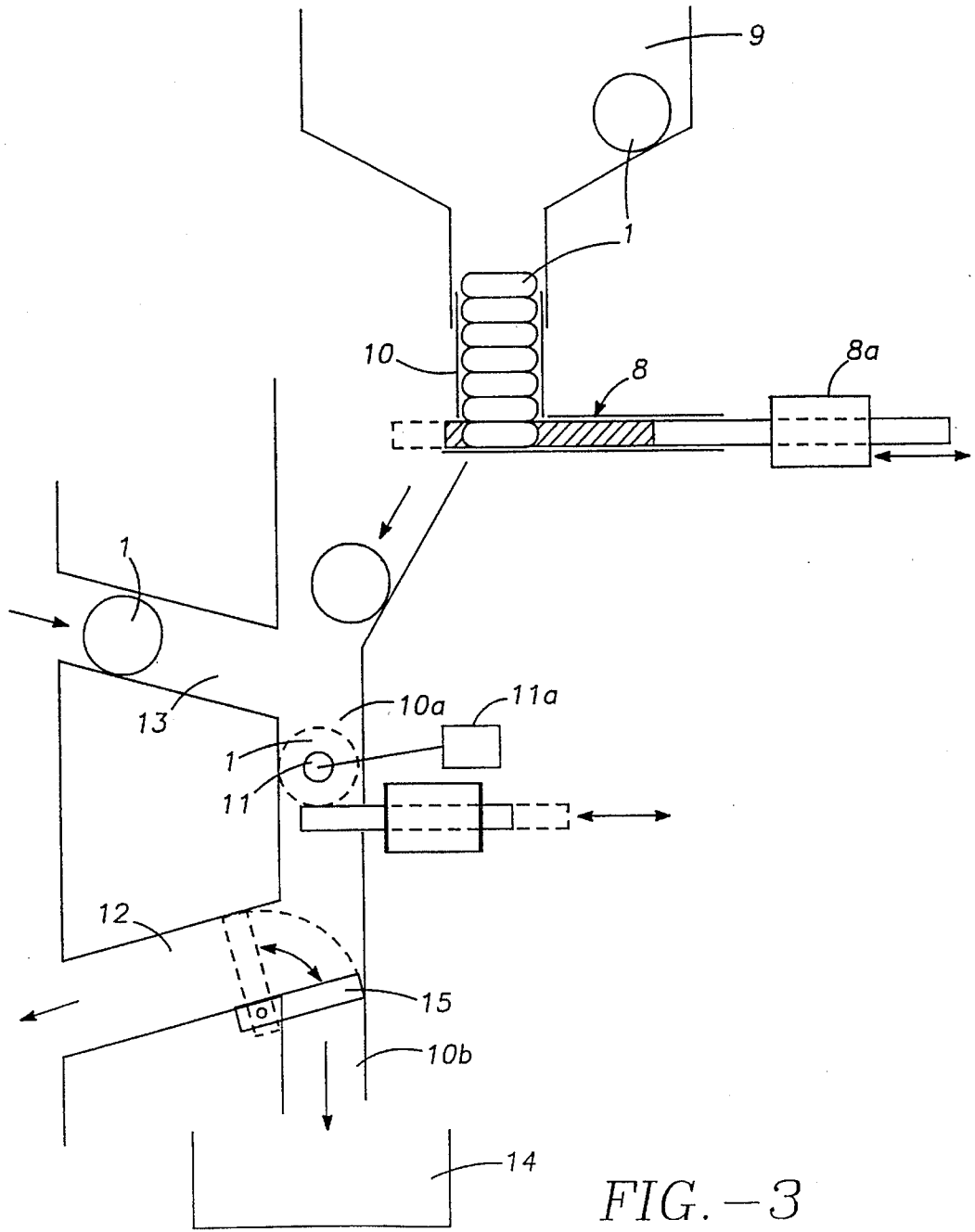
FIG. 3 is a diagrammatic view of a dispensing and controlling device with parking cards.

The use of the above-described parking cards in a parking system is described in more detail below based on FIG. 3, which shows a diagrammatic view of an entrance or exit control station of a parking system.

The parking cards in form of a plastic piece 1 are issued at the entrance of a parking garage or parking lot by a dispenser 8 including a reciprocating card discharge slide 8a from a supply unit 9 with a chute 10. Prior to issue, a read and control point 11 in a chute 10a, which the parking card must pass, reads the particular card code and sends it to a computer 11a, which adds and stores the time of entrance, the date and the station number. When the parking card is taken from a slot 12, a barrier which is not shown is opened.

On return, the user inserts the card into a slot at a non-illustrated cash point. Here the code is read and the entrance time compared with the actual time and the parking fee calculated and shown. After payment of the parking fee the parking card is released and drops into the change tray with the receipt and change applicable. The computer registers the new time and adds an allowance during which time the car park user must leave the car park.

With the same parking card the user drives to the exit and inserts the card into an input slot 13. In shaft 10a, the parking card is retained and the code compared with the computer data. If valid the barrier opens and the parking card drops down an extension 10b of shaft 10a into a tray 14. If invalid a sorting device 15 protruding into shaft 10a directs the parking card into output slot 12 and returns it.

The parking system can also be used by long-term parkers or for rentals in car parks. In this case, the computer is first of all informed of the code and assigns this number to a long-term management system. Every time the parking card is input the data in the long-term parking management is checked and compared. The long-term parker or renter inserts his/her parking card into input slot 13. The parking card is verified in shaft 10a and returned to the user. When it is removed from output slot 12 the barrier opens. If the parking card is invalid it is directly by means of sorter 15 to tray 14 and the invalidity displayed. The same procedure takes place at the exit. The code is conveyed to the computer, if valid the barrier opens and the parking card is returned. In the computer the information PRESENT or ABSENT is added. The date, the time, etc. can be added in the same way.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method for operating a parking concession comprising the steps of:

storing at a first location a plurality of parking cards, each comprising a round, flat piece of material with a front and reverse side, containing a non-contact machine-readable data medium for storing parking data;

determining when a parking customer is present at an entrance to a parking area;

selecting one of said plurality of parking cards or inserting a selected parking card of a past use into first location by a parking customer;

reading a card code from said selected parking card independent of the position of said parking card and electronically storing parking data within said parking card;

issuing said selected parking card to said parking customer;

opening an entrance barrier to said parking area allowing said parking customer to enter;

when said parking customer desires to exit said parking area, receiving from said parking customer said selected parking card into a payment location; and reading said parking data from said selected card in order to determine the associated parking fee.

2. A method as in claim 1 wherein said selected parking card is retained at an exit location and is returned for storing at said first location.

3. A method as in claim 1 wherein said selected parking card is returned to said parking customer upon his exit for future use during a subsequent parking period, and is retained after a certain subsequent parking period at an exit location and is returned for storing at said first location.

4. A method as in claim 1 which further comprises the steps of: p1 after said selected parking card is received at said payment location, determining whether an excessive period of time has elapsed since the payment of said parking fee.

5. A method as in claim 1 which further comprising the steps of:

after receipt of said selected parking card by said payment location, reading said card code and determining if said parking fee has been paid and, if so, causing an exit barrier to open.

6. A method as in claim 11 which further comprises the steps of, after determining said associated parking fee:

accepting payment of said parking fee from said customer and returning said selected parking card to said parking customer; and receiving at an exit location said selected parking card from said parking customer and in response thereto opening an exit barrier allowing said parking customer to exit said parking area.

7. A method as in claim 1 which further comprises the steps of, after determining said associated parking fee:

accepting payment of said parking fee from said customer and in response thereto opening an exit barrier allowing said parking customer to exit said parking area.

8. A method for operating a parking concession, comprising the steps of:

storing at a first location a plurality of parking cards, each comprising a round, flat piece of material with a front and reverse side, containing a non-contact machine-readable data medium for storing a card code;

determining when a parking customer is present at an entrance to a parking area;

selecting one of said plurality of parking cards or inserting a selected parking card into said first location by a parking customer;

reading said card code from said selected parking card independent of the position of said parking card and electronically storing parking data within said parking card;

issuing said selected parking card to said parking customer;

opening an entrance barrier to said parking area allowing said parking customer to enter;

when said parking customer desires to exit said parking area, receiving from said parking customer said selected parking card into a controlling device at an exit location;

reading said parking data from said selected card in order to determine the associated parking fee;

checking validity of said selected parking card; and returning said selected parking card to said parking customer and in response thereto opening an exit barrier allowing said parking customer to exit said parking area if said parking card is valid.

9. A method as in claim 8 wherein said selected parking card is retained at said exit location if non-valid and is returned for storing at said first location.

10. A method as in claim 8 wherein said selected parking card is returned to said parking customer upon his exit for future use furing a subsequent parking period and is retained if determined as non-valid and is returned for storing at said first location.

* * * * *

UNITED STATES PATENT AND TRADEMARK OFFICE
CERTIFICATE OF CORRECTION

PATENT NO. : 5,500,515
DATED : March 19, 1996
INVENTOR(S) : Johann Farmont

It is certified that error appears in the above-indentified patent and that said Letters Patent is hereby corrected as shown below:

Column 4, line 21, delete "pl";

Column 4, line 31, delete "claim 11" and insert --claim 1--.

Signed and Sealed this

Twenty-fifth Day of June, 1996

Attest:

BRUCE LEHMAN

Attesting Officer     Commissioner of Patents and Trademarks